(No Model.)
M. L. SENDERLING.
VEHICLE SEAT LOCK.
No. 505,854. Patented Oct. 3, 1893.
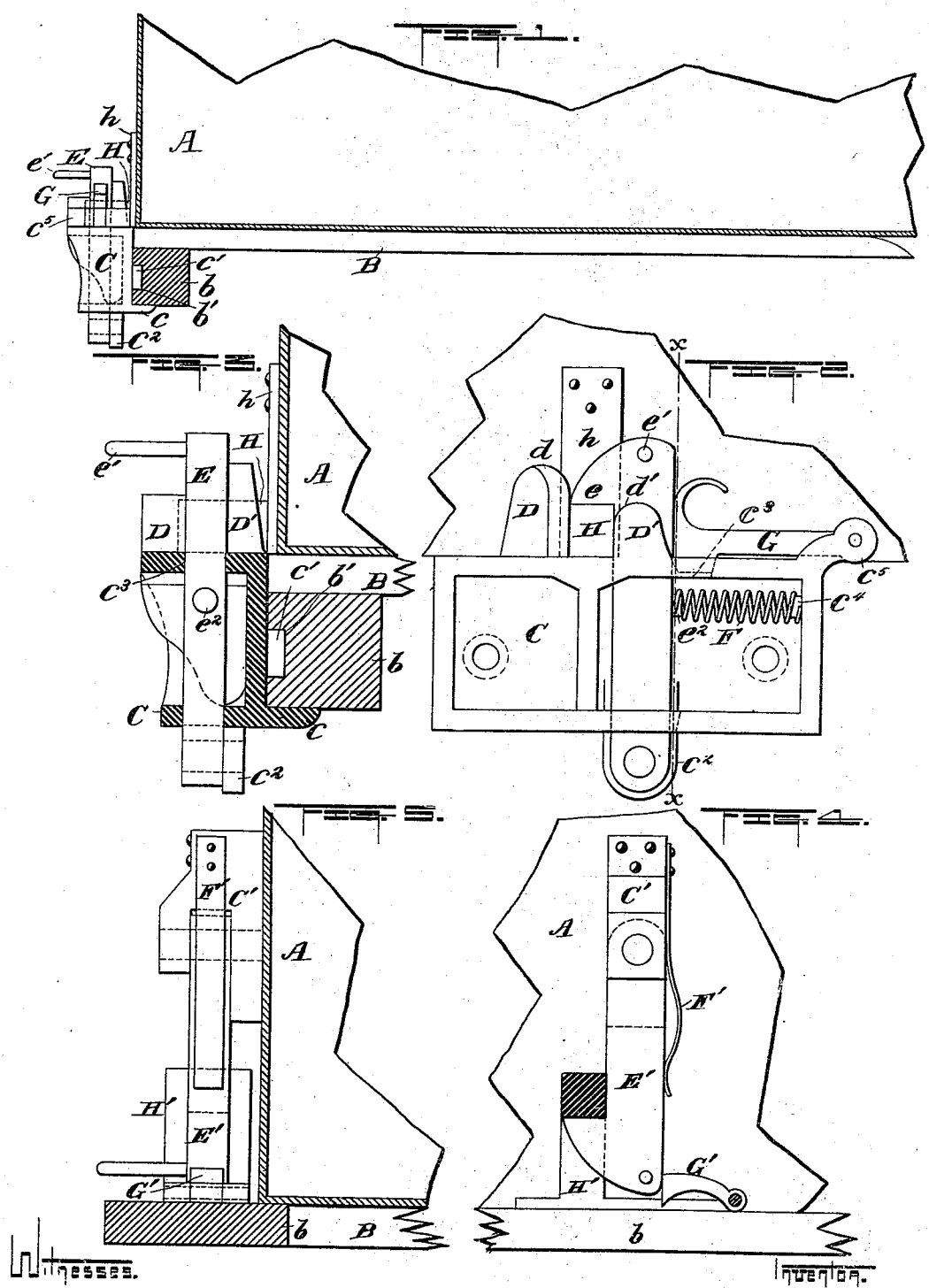
Witnesses.
Inventor.
Martin L. Senderling.
by attorneys.

UNITED STATES PATENT OFFICE.

MARTIN L. SENDERLING, OF JERSEY CITY, NEW JERSEY.

VEHICLE-SEAT LOCK.

SPECIFICATION forming part of Letters Patent No. 505,854, dated October 3, 1893.

Application filed December 29, 1892. Serial No. 456,685. (No model.)

*To all whom it may concern:*

Be it known that I, MARTIN L. SENDERLING, of Jersey City, in the county of Hudson and State of New Jersey, have invented a new and useful Improvement in Locks for Tilting Vehicles, of which the following is a specification.

My invention relates to an improvement in locks for tilting vehicles, and more particularly to locks for securing the tilting body of a dump cart or wagon to the body supporting frame.

A practical embodiment of my invention is represented in the accompanying drawings, in which—

Figure 1 is a vertical longitudinal sectional view of a portion of the tilting body of a vehicle and its supporting frame, showing the lock attached thereto as it appears from the side of the vehicle. Fig. 2 is an enlarged front view of the lock and a portion of the body adjacent thereto. Fig. 3 is a vertical transverse section through line $x$, $x$ of Fig. 2. Fig. 4 is a front view of a modified form of lock, showing the catch in section; and Fig. 5 is a view of the same as it appears from the side of the vehicle.

A represents the body of the vehicle and B one of the side rails of its supporting frame, a cross bar $b$ being located beneath the forward end of the body A.

As represented in Figs. 1, 2 and 3, a metallic frame C—here shown of a general oblong rectangular form—is provided at its upper edge with uprising guide jaws or lugs D, D', spaced a short distance apart and having their upper ends made flaring on their adjacent faces, as shown at $d$, $d'$. The jaw or lug D' is bifurcated to permit the latch to swing between its branches. The frame C is further provided at its lower edge with a rearwardly projecting flange $c$ and, at intervals along its central portion with rearwardly projecting bosses $c'$, the former $c$ to extend under the front side of the cross beam $b$ and the latter to enter sockets $b'$ in the cross beam to assist in holding the frame C firmly in position.

The latch is denoted by E. It is pivoted to a depending portion $c^2$ of the frame and extends thence upwardly through an elongated slot $c^3$ in the top of the frame. It is provided with a nose $e$ adapted to hook over the catch when the latter is seated between the jaws D, D' and has an operating handle $e'$ projecting from its head. A spring F is inserted between the back of the latch and the end of the frame C, oppositely faced lugs or bosses $e^2$ and $c^4$ being provided, the former on the latch and the latter on the frame, for seating the ends of the spring. The tension of the spring F tends to hold the latch in the locked adjustment.

A stop G is pivoted between a pair of ears $c^5$ on the corner of the frame C and is adapted to swing down into engagement with the back of the latch when the latter is in locked adjustment, and to retain its position under the influence of gravity, to prevent the latch from unintentionally springing back. The catch consists in the present instance of a short bar H projecting forwardly from the front of the wagon body in position to pass between the jaws D, D' as the body returns from its tilted to its normal position. The bar H may conveniently form a part of an L-shaped piece, the upright leg $h$ of which may be bolted or otherwise securely fastened to the front of the body, the horizontal leg forming the catch bar H.

In operation, the body may be released by first throwing the stop G over, out of engagement with the latch and then forcing the latch back against the tension of the spring F until its nose clears the bar H. In returning from its tilted to its normal position the bar H will strike the beveled end of the latch and press it back sufficiently to permit the bar to seat itself between the jaws D and D', when the latch will spring back and retain it. The stop G may then be swung over into engagement with the latch to complete the locking.

In the form shown in Figs. 4 and 5, the latch E' is pivoted to a frame C' secured to the front of the body A and the catch H' consisting of an inverted U-shaped piece, is fixed to the body supporting frame. A spring F' bears against the back of the latch to hold it in engagement with the catch, and a pivoted stop G' is located in position to hold the latch against unintentional displacement.

The structure is such as to provide effectually against accidental unlocking. The body is held snugly in position and the parts are so assembled as to be readily manipulated by the operator.

What I claim is—

1. In a vehicle, a pivoted latch, a spring for pressing the latch to its work, a catch for engaging the latch, a stop for holding the latch locked, a tilting body and a body support, the latch and the catch being secured, the one to the body and the other to the body support, substantially as set forth.

2. In a vehicle, a tilting body and a body support, a catch secured to the body, a pivoted latch secured to the body support, jaws or guides for directing the catch to its seat, a spring engaged with the back of the latch to hold it to its work, and a pivoted stop secured to the body support in position to swing into engagement with the latch to lock it, substantially as set forth.

3. The latch frame having a latch pivoted to it to swing back and forth in a slot therein, guide jaws on the frame, a pivoted stop secured to the frame, and a spring inserted between the latch and a portion of the frame, in combination with a catch and suitable supports for the frame and catch, substantially as set forth.

MARTIN L. SENDERLING.

Witnesses:
FREDK. HAYNES,
GEORGE BARRY.